United States Patent Office 3,377,272
Patented Apr. 9, 1968

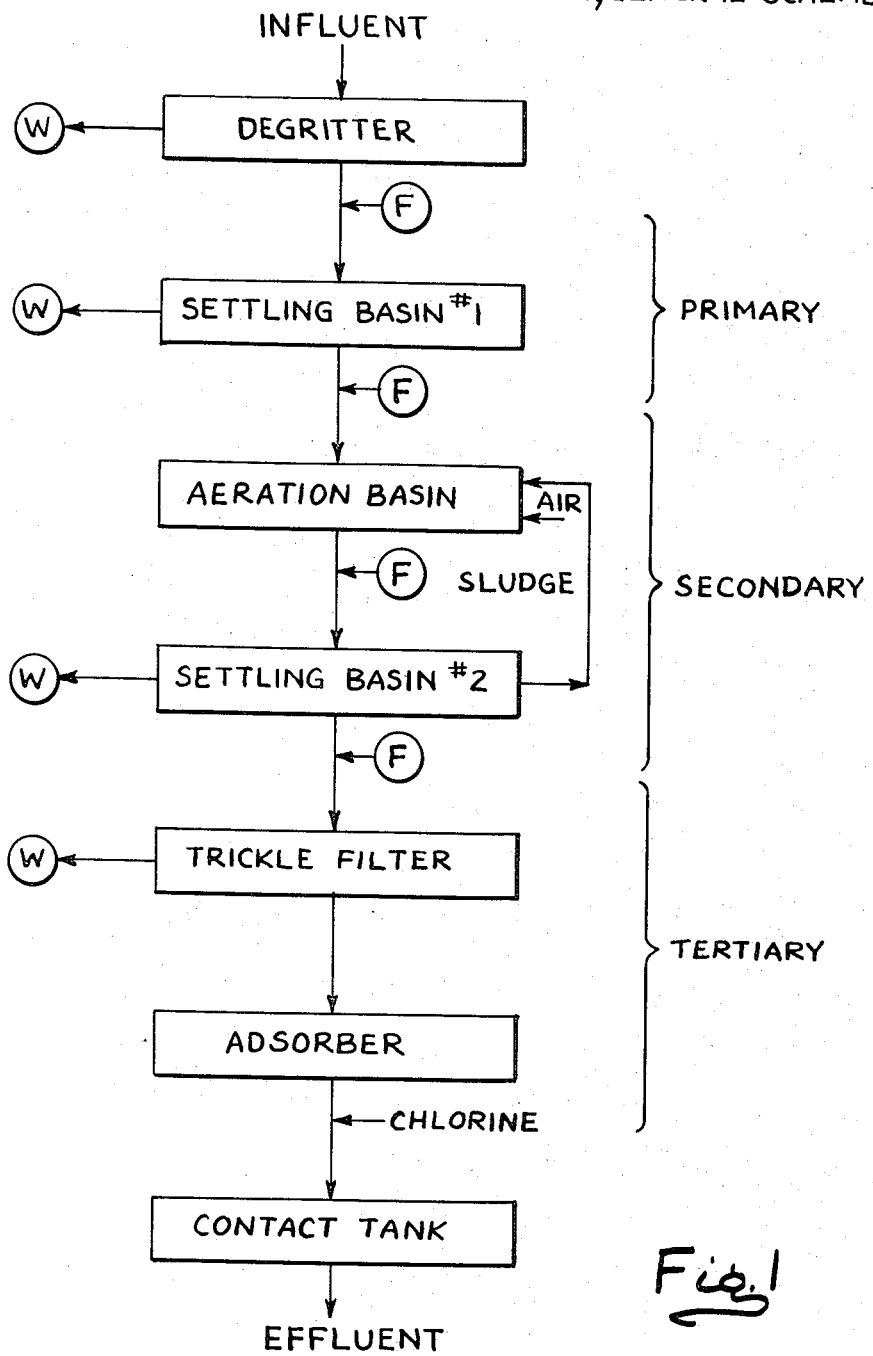

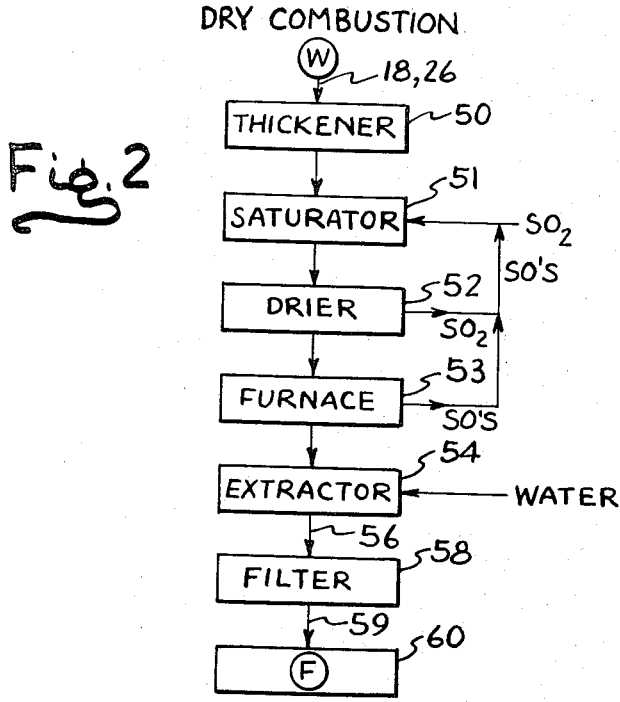
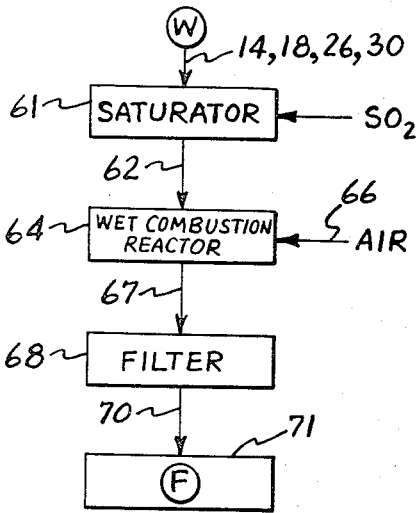
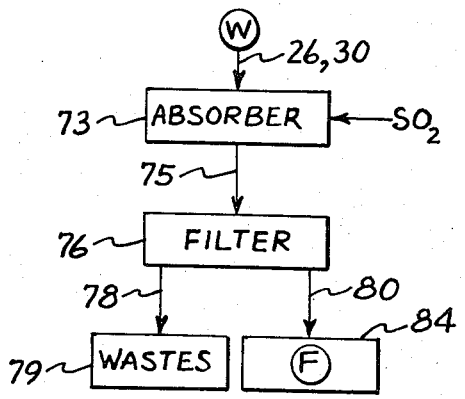

3,377,272
PROCESS FOR THE TREATMENT OF
WASTE-CONTAINING WATERS
Everett Douglas Cann, Freeport, Ill., assignor of forty
percent to William T. Neiman
Continuation-in-part of application Ser. No. 453,351,
May 5, 1965, which is a continuation-in-part of
application Ser. No. 270,917, Apr. 5, 1963. This
application June 8, 1966, Ser. No. 556,051
4 Claims. (Cl. 210—45)

ABSTRACT OF THE DISCLOSURE

Waste-containing waters are treated for purification, disposal, or reuse by contacting with a soluble sulfur oxide salt of the metals aluminum and/or iron alkalized to form a waste-cohering hydroxide floc, recovering the floc and wastes, treating recovered material with sulfur dioxide to re-dissolve the metal, and cycling the resultant soluble sulfur oxide salt of the metal to the contacting step.

This is a continuation-in-part of my application Ser. No. 453,351, filed May 5, 1965, and now U.S. Pat. No. 3,268,443, which in turn is a continuation-in-part of my application Ser. No. 270,917, filed Apr. 5, 1963, now abandoned.

This invention relates to the treatment of waste-containing waters for purification, disposal, or reuse. More particularly, the invention provides a process for treating either industrial or domestic waste liquors, or to the purification of contaminated natural waters to render them potable.

Efficient water treatment—both for purification and disposal—is important to the health of any community. Purification of contaminated natural water to render it potable is an obvious necessity. On the other hand, industrial and domestic waste water, generally in the form of water containing minor amounts of suspended and dissolved organic and inorganic solids, must also be treated to condition the water before releasing it to rivers or lakes.

A variety of different techniques are available for treating waste-containing waters. In general, these include a primary stage for physically separating settleable insoluble wastes from the water, a secondary stage for contacting the contaminated water with a molecular oxygen containing gas to effect aerobic bacterial oxidation of colloidally dispersed and dissolved wastes, and a tertiary stage in which contamined water is contacted with an adsorbent to remove dissolved and suspended wastes, microorganisms, etc. Depending on the degree of initial contamination and the extent of purification required, one or more of the foregoing stages may be eliminated, or in same instances may be supplemented by further treatment.

A common denominator in all processes for treating contaminated water is that the wastes are usually in a low concentration. Consequently, the equipment is almost inevitably large in size and expensive to install and maintain.

It has long been recognized that waste water treating equipment may be reduced in size and increased in efficiency by supplementing the treatment outlined above with chemical flocculating agents. These are either inorganic materials such as aluminum sulfate, iron sulfate or chloride, magnesium or zinc sulfate, or various hydrophilic organic polymers which form a sticky floc. This floc combines with suspended waste solids and accelerates gravity settling of the solids. In addition, flocculating agents coalesce any colloidally suspended waste solids which would otherwise be immune to gravity settling.

However the advantages of flocculating agents are not without concurrent difficulties. Chief among these is the cost of flocculating agent. It is accordingly a primary objective of the present invention to provide an improved process for treating waste-containing waters using flocculating agents which are capable of facile regeneration and recycle.

A concurrent object of the invention is to provide an improved water treatment process that may be incorporated into existing water purification or water disposal plants currently in existence, or which may be designed into newly-built plants. When installed in existing water treatment plants, the inventive process permits an increase in throughput capacity without the addition of substantial capital equipment; alternatively, or in conjunction therewith, it permits of more efficient water treatment, that is, the discharge of a higher purity effluent. A related object is to reduce the operating costs of such plants.

Another objective of the invention is to provide a processing technique for inclusion into newly designed plants, which technique allows such plants to eliminate heretofore essential but expensive treatment steps. Otherwise stated, inclusion of the inventive process into a water treatment plant permits overall simplification of the treatment process by eliminating one or more water treatment stages.

Still another object is to permit new plants to be smaller in size and/or have greater treatment efficiency than would otherwise be possible.

An additional object, particularly significant when the treated effluent is required to have low calcium hardness, is to provide a method which allows lime to be used to form a floc, yet which prevents the calcium from being carried with the effluent.

Further objects, aims, and advantages of the invention will become apparent as the description thereof proceeds.

Briefly, and in accordance with the invention, I enhance the effectiveness of waste-containing water treatment techniques by introducing, as a flocculating agent, a soluble sulfite or sulfite complex of aluminum and/or iron (ferric or ferrous) which is alkalized to form an aluminum or iron hydrous oxide (hydroxide) floc. The resultant floc coalesces suspended solid wastes which are then collected and contacted with a reagent consisting essentially of aqueous sulfur dioxide ($SO_2$) to dissolve and thereby recover the aluminum or iron as a soluble sulfite or sulfite complex. The resultant soluble sulfite or sulfite complex of aluminum or iron is then available for cycling back to the initial flocculation step.

The term "sulfite or sulfite complex," which will hereinafter be foreshortened to "sulfite," is intended to denote the soluble reaction product formed by reaction of an aluminum or iron compound with sulfur dioxide or with sulfurous acid. It is not known, nor is it material, what formula the reaction products have, but in any event the products are characterized by their solubility in a solution containing an excess of sulfurous acid.

In one form of the invention, a stream of the aluminum and/or iron floc and coalesced wastes is contacted with sulfur dioxide (gaseous or as sulfurous acid) and burned under combustion conditions to burn off the waste and to form a furnace ash containing aluminum and/or iron sulfate ash. The ash is then extracted with water to recover the soluble aluminum and/or sulfate, which is then in a form suitable for recycling.

In a second form, applicable to aluminum and/or iron, the stream of floc and coalesced wastes is first contacted with sulfur dioxide (gaseous or as sulfurous acid) to form an aluminum and/or iron sulfite, and the resultant slurry subjected to liquid phase combustion with an oxygen-containing gas. The product is a solution containing a soluble sulfite of aluminum and/or iron, which may be recycled to the flocculating step.

In a third form, oxidation of the wastes is made unnecessary, and instead the stream of floc and waste is contacted with sulfur dioxide (gaseous or as sufurous acid) to dissolve and extract the aluminum and/or iron as the soluble sulfite. The resultant slurry is physically treated, as by filtration, centrifugation, etc., to separate the waste solids from the solution, which may then be recycled.

A particular advantage of the invention is that it may be incorporated into diverse types of water treatment processes. Below is described a generalized process for the treatment of waste-containing water, it being understood at the outset that existing processes frequently omit one or more of the steps or stages shown below, and may include additional stages.

The invention in its various aspects will be more fully described in the ensuing specification, which is to be read in conjunction with the annexed drawings wherein:

FIGURE 1 depicts schematically a generalized process for the treatment of waste-containing water, which process advantageously incorporates the improvement of the present invention;

FIG. 2 schematically depicts a flow sheet of a form of the invention which includes dry combustion of a mixture containing an aluminum and/or iron hydroxide floc and separated wastes which has been previously treated with sulfur dioxide;

FIG. 3 schematically depicts a flow sheet of a process according to the invention which involves wet combustion of the aforesaid mixture; and FIG. 4 schematically depicts a flow sheet of a form of the inventive process which eliminates any combustion of the wastes.

While the invention is susceptible of various modifications and alternative forms, specific embodiments thereof have been shown by way of example in the drawings and will herein be described in detail. It should be understood, however, that it is not intended to limit the invention to the particular forms disclosed, but, on the contrary, the invention is to cover all modifications, equivalents and alternatives falling within the spirit and scope of the invention as expressed in the appended claims.

Turning first to FIG. 1, the schematic flow sheet will be recognized as illustrating a three stage of process for treating waste-containing water. Initially, the influence 11 is passed to a degritter 12 for the purpose of removing gross particles of solids; a degritter is, in essence, a mechanical filter which separates solid wastes W 14 from the remaining stream.

The effluent 15 from the degritter 12 then is usually passed to a first settling basin 16 as the primary stage. Here the finely dispersed but non-colloidal insoluble wastes are settled out in the form of a concentrated sludge, also designated as a waste stream W 18, and the water discharged via conduit 19 to the aeration basin 20. Physically, the settling basin 16 is usually a thickener tank, but may be or include a clarifier, a bank of hydrocyclones, a filter, or the like, each of which performs a physical separation of insoluble wastes from the water.

The settling basin effluent 19 then generally passes to an aeration basin 20 which is charged with a recirculating activated sludge stream 21 containing aerobic bacteria. The sludge commingles with the inffluent 19 to the aeration basin 20 and, under the influence of a myriad of finely dispersed air bubbles 24, digests dissolved and suspended wastes by bacterial action to support growth and multiplication of bacterial cells, which by aggregating with the suspended solids present yield settleable particles.

From the aeration basin 20, the effluent is sent to a second settling basin 25 (which may be similar to the previous settling basin 16) which separates treated water from sludge for recirculation via conduit 21 and as a waste stream W 26, above.

Leaving the settling basin, the water 28 may then be sent to a tertiary stage for additional treatment. Such tertiary stages are becoming increasingly popular as the requirements for a more highly purified final effluent become widespread. Tertiary stages further purify the waste-containing water through occlusion by the floc and by contact with the floc and other adsorbents which are effective to remove traces of dissolved and suspended wastes. In the illustrative embodiment shown above, the tertiary stage consists of a sand or trickle (trickling) filter 29 filled with graded sand, the initial sand layer being coarse and the final sand layer or layers being fine. This arrangement of at least two grades of sand permits the inclusion of a filter aid such as a flocculating agent or diatomaceous earth, which collects on the coarse sand but which would soon plug the fine sand. Wastes and filter aid may be removed from the trickle filter by backflushing, and are shown in the above flow sheet as stream W 30 leaving the trickling filter.

From the trickle filter the water filtrate 31 is sent to an adsorber 32 where additional dissolved and suspended wastes are removed. The adsorber 32 contains a surface active material such as finely divided soft coal, charcoal, activated carbon or the like, or may be or include a cationic or anionic ion exchange resin, depending upon the ultimate purity requirements of the effluent.

After the adsorber 32, the water 34 may be sent to a flash contact tank 36 for admixing and reaction with chlorine gas 35 for final purification of the effluent 38.

As before stated, it is commonplace to employ only a portion of the treatment steps indicated above; the entire combination is capable of rendering a municipal waste suitable for drinking purposes, but is rarely necessary or desirable. For example, comparatively few plants at present use a tertiary stage, and many omit either the primary stage or the second stage. But in any event, all plants for treating waste-containing water separate as much as possible of the waste from the water, and all are improved by incorporation the improvement of the present invention.

In the schematic flow sheet, several streams 39, 40, 41, 42 are shown as F, or flocculating agent streams. One or more of such streams may be used, it being an advantage of the invention that the availability of a low cost and re-usable flocculating agent permits unusual improvement in the operation of the primary, the second, and/or the tertiary stage. (See FIG. 1).

In whatever stage or stages the inventive flocculating agent is added, it is introduced in the form of a solution of soluble sulfite or sulfite complex of aluminum or iron, or a mixture of such salts, as will be described hereinafter. The salt is then treated with an alkali such as calcium or sodium hydroxide to provide a neutral or slightly alkaline environment in which the soluble sulfite or sulfite complex of aluminum or iron forms the hydroxide by a double displacement reaction. It is this hydroxide which is the sticky floc used herein.

When the inventive flocculating agent is added to the primary stage, it is introduced preferably into a mixer disposed between the degritter 12 and the first settling basin 16 (FIG. 1). The alkali may be added concurrently with or before or after the flocculating agent, depending upon individual choice and circumstances, but for simplicity is omitted from the FIG. 1. Formation of the floc occurs rapidly, and is effective at concentrations of as little as 5 p.p.m. or less to as much as 500 p.p.m. or even more. Indeed, a particular advantage of the re-usable floc invention is that large amounts of flocculating agent may be used, which affords formation of a considerable amount of floc for rapid and thorough flocculation.

The floc forming in the first settling basin 16 occludes suspended solids and is withdrawn via the symbolic stream W 14 leaving the first settling basin 16. This stream is then treated for recovery and recycle of the aluminum and/or iron values, as will be described presently.

The effluent 19 from the first settling basin, that is, the stream going to the secondary stage, similarly benefits from the inclusion of the inventive flocculating agent, shown as stream F 40 joining the water 19 entering the aeration basin 20. The alkalinity here may be adjusted to a neutral or alkaline pH, e.g., above about 7.0 and below about 9.0, by the addition of any necessary alkali to form the floc.

In the aeration basin 20, it is found that the presence of a substantial floc has a multiple effect. First, the admixture of floc and activated sludge appears to enhance biological activity of the aerobic bacteria. Second, the presence of a floc serves to entrap the fine air bubbles and thereby facilitate distribution of the air into the treated liquid. Third, it appears that a large amount of floc in combination with the activated sludge provides an environment specially conducive to the removal of organic phosphate wastes and inorganic phosphate detergent residues. This latter benefit is particularly noteworthy in view of current interest in removing detergent residues from municipal waste water effluents.

When the flocculating agent is or contains aluminum, the resultant floc is sufficiently light in weight such that intensive aeration may form a substantial scum composed of sludge, aluminum hydroxide, and occluded air bubbles. In many instances this becomes a real advantage, in that the scum can readily be removed and concentrated. Apparatus for removing both scum (at the top of an aeration vessel) and sludge (at the bottom) are well known, and are represented by the Rex Float-Treat Separator and Thickener (see Bulletin No. 315–101, by Rex Chainbelt Inc., copyright 1962). Moreover, aluminum hydroxide floating scums are readily adaptable to aeration under superatmospheric pressure, in addition to the more conventional atmospheric aeration.

If desired, flocculating agent 41 may be introduced between the aeration basin 20 and the settling basin 25 to further improve the effectiveness and throughput rate of the latter. The agent here may be introduced irrespective of whether there has been upstream flocculation, and has the manifest advantage of increasing the settling rate in this basin.

The mixture of aluminum and/or iron hydroxide with sludge, i.e., wastes, is withdrawn from the second settling basin 25 as stream W 26.

Following the second settling basin 25, a stream 42 of flocculating agent may be added prior to introduction into the filter 29. This is rarely necessary if there has been sufficient upstream flocculation, but in particular circumstances, especially when the adsorber 32 is being called upon to effect substantial removal of dissolved and suspended wastes, a flocculating agent upstream of the filter 29 substantially reduces the adsorber load. Flocculating agent here entraps waste solids on the coarse sand layer of the filter 29, and is back-flushed off periodically as a waste stream W 30 shown leaving the filter 29.

As stated before, one of the outstanding advantages of the present invention is that it greatly increases the throughput capacity of a given treating stage, it improves the efficiency of treatment in such stage, or it performs both functions. Thus, sufficient flocculating agent in the first settling basin 16 may be readily reduce the settling time to one-half, or sometimes even as little as one-fourth of the time to achieve a given purification than had previously been possible. As a consequence, the throughput to a settling tank may be increased by a factor of two or even more without adversely affecting its performance.

Similarly, a soluble sulfite or aluminum and/or iron introduced into the aeration basin 20 can often permit doubling of the throughput through a secondary stage. Moreover, the degree of purification in this stage is frequently higher than when performed in the absence of a flocculating agent.

The combination of flocculation in the first settling basin 16 and flocculation in the secondary stage has a multiple effect on the permissible capacity of any given contaminated water treatment process. By removing more of the solids in the first settling basin 16 or primary stage, this reduces the load on the areation or secondary stage 20, 25 and thus allows a vastly greater througput into the system without incurring any significant disadvantages.

As before stated, it is necessary to recover aluminum or iron values from the wastes in order to realize optimum benefits of the invention. Such recovery of aluminum and/or iron is effected, according to one aspect of the invention, by burning under controlled conditions the sulfur dioxide saturated mixture of waste and hydroxide floc W to oxidize the waste and the aluminum and/or iron sulfite and then recover an ash containing aluminum and/or sulfate (per FIG. 2). This combustion may be effected in conventional furnaces or kilns, advantageously after drying the sulfur dioxide treated wastefloc mixture to remove gross amounts of water. It is preferred however to maintain the burning temperature below about 1400° F. when aluminum alone is present, and below 90° F. when iron is present so as not to decompose the resultant aluminum and/or iron sulfate. Alternatively, a submerged or wet combustion process (per FIG. 3) may be used (e.g., U.S. 2,665,249), or combustion may be eliminated entirely (per FIG. 4).

After burning as shown in FIG 2, the resultant ash contains aluminum and or iron sulfate together with ash from organic and inorganic components of the original waste. In addition, there may be more or less of calcium compounds resulting from alkalization of the flocculating agent. It is accordingly desired to separate, as nearly as possible, substantially all of the aluminum and/or iron sulfate from the ash. Such separation is accomplished, pursuant to the invention, merely by extracting the ash with water.

To a considerable extent the hardness requirements of the final effluent dictate the choice between the particular alkali used in forming the floc, i.e., between lime and caustic. It is in this respect that the use of inorganic flocculating agents have heretofore been found objectionable, in that their use resulted in the addition of considerable amounts of calcium and/or sodium salts to the treated waters. However, the use of lime in the present invention, in combination with a sulfite flocculating agent, does not seriously increase the salt content of the water by reason of the insolubility of calcium sulfite. Thus, in the present invention, low cost lime is in fact the alkali of choice.

Sulfur dioxide with minor amounts of sulfur trioxide, or its respective aqueous solution, maybe obtained from a variety of sources. Elemental sulfur may be burned locally in a conventional type of sulfur burner or in the furnace used to burn the waste to produce a sulfur dioxide gas containing a minor amount of sulfur trioxide, both of which may be scrubbed out by contacting the gas with a slurry of aluminum or iron floc and waste. Alternatively, liquid sulfur dioxide or sulfur oxide containing industrial waste gases may be used as a source of sulfur dioxide.

It will be understood that, in any case, the sulfur oxide gas obtained by combustion of elemental sulfur in air will normally predominate in sulfur dioxide, with only a small amount of sulfur trioxide being formed (in the absence of special combustion techniques or special oxidation catalysts). In most cases the amount of sulfur trioxide will be relatively small, and provided it does not constitute more than say 10% or so, may ordinarily be retained with the sulfur dioxide and used in the process of the invention. Combustion of elemental sulfur at low temperatures and with relatively large amounts of excess air tend to favor sulfur trioxide formation, while the opposite conditions minimize the amount of sulfur trioxide likely to be formed. Minimizing the amount of sulfur trioxide is generally preferable in a system for treating water that is to be purified for potable and other domestic uses, as sulfur trioxide leads to the formation of calcium sulfate (by reaction with calcium hydroxide used to prepare the floc) which can create undesirable calcium hardness and salt (calcium sulfate) concentration in the effluent.

The system of the invention is exemplified by the following illustrative specific embodiments, it being understood that the flows and quantities are for illustrative purposes only and are not intended to be wholly definitive or exclusive with respect to scope or conditions.

EMBODIMENT I

This embodiment, taken in conjunction with FIGS. 1 and 2, illustrates the system of the invention as applied to the treatment of a municipal waste, and includes dry or oxidative combustion to recover the flocculating agent.

The influent 11, in this case FIGS. 1 and 2, is fed in an average daily rate of fifty million gallons, and contains 5.0 ml. per liter of settleable solids (as determined with an Imhoff cone), about 70 p.p.m. of suspended solids, and about 50 p.p.m. of BOD (biological oxygen demand) wastes.

The influent 11 is fed to a degritter 12 for removal of large particles of waste, and thence to a mixer (not shown) where it is combined with recycle aluminum and/or sulfite complex or salt in 5% solution form via line 39 in an amount sufficient to provide a concentration of 50 p.p.m., and with sufficient calcium hydroxide to form a floc, e.g., pH between about 7.0 and 8.0.

Liquid is permitted to remain in the first settling basin 16 for about one hour, during which time floc and settleable waste solids are withdrawn via stream or conduit 18.

The liquid in conduit 19 leaving settling basing 16 is then conducted to the secondary stage comprising aeration basin 20 and second settling basin 25, operating as an atmospheric pressure activated sludge system. Before introduction to the areation basin 16 an additional quantity of about 5% aluminum and/or iron sulfite solution is added via conduit 40 to form a 50 p.p.m. floc concentration, with pH adjustment to form the floc, and areation is conducted for about two hours. The aerated mixture of water, sludge, and floc is then fed via conduit 22 to the second settling basin 25 where it remains for about thirty minutes, and where scum and sludge are withdrawn respectively from the top and bottom and discharged via conduit 26. (In this illustrative embodiment no additional flocculating agent is added between the aeration basin and second settling basin.)

The effluent from the second settling basin 25 is passed through a trickle filter 29, in this case without the supplemental addition of flocculating agent, and thence to a bed of adsorbent charcoal 32. Following the adsorbent charcoal bed 32 chlorine is added via conduit 35, and, after a brief period in the contact tank 36, the final effluent 38 is discharged as a potable water.

Referring to FIG. 2, wastes in conduits 18, 26 from the first and second settling basins 16, 25 (of FIG. 1) are combined and sent to thickener 50, where the stream is thickened to between 25 to 50 weight percent dry solids. The waste streams 14, 30 from the degritter 12 and trickle filter 29 respectively of FIG. 1 are free of aluminum, and thus may be processed separately. Waste streams 18, 26 contain before thickening, about 6–10 weight percent total solids, of which approximately one quarter is aluminum hydroxide.

Sufficient sulfur dioxide gas is added to the mixture in saturator 51 to lower the pH to between 3 and 5, so as to convert the aluminum and/or hydroxide floc to an aluminum and/or iron sulfite complex. Saturator 51 is an agitated vessel or vessels with or without an auxiliary absorption tower, which may be operated continuously or batchwise.

The sulfur dioxide saturated mixture is then passed to drier 52, where it is dried to about 70 weight percent dry solids before passage to furnace 53. Sulfur dioxide evolved in drier 52 is returned to saturator 51 for re-use. This furnace may be of any type such as rotary kiln "Herreshalf," fluidized bed, etc., where in the presence of excess oxygen (air) the organic materials present are oxidized mainly to carbon dioxide, and where the aluminum and/or iron sulfite is oxidized to aluminum and/or iron sulfate. The temperature must be maintained below 1400° F. when aluminum alone is present, and below 900° F. when iron is present, to avoid decomposing the aluminum and/or iron sulfate, which would make re-solution thereof in water difficult. Surfur oxides evolved in furnace 53 are returned to saturator 51 for re-use.

Leaving furnace 53, the furnace ash—by now consisting predominantly of aluminum sulfate with some calcium salts or oxides—is quenched with water in extractor 54, consisting of an agitated vessel or equivalent equipment. In extractor 54 the furnace 53 ash is intimately contacted by sufficient water to dissolve substantially all the aluminum and/or iron sulfate present.

Leaving extractor 54, the stream 56 is a solution of aluminum and/or sulfate, and contains suspended therein the residual non-extractable components of furnace ash. These components are mainly sand, calcium compounds, unoxidized organic materials, etc. insoluble in water.

The stream in conduit 56 is then conducted to filter 58 where insoluble solids are removed. The effluent from filter 58, conducted via line 59, is approximately 5% aluminum and/or iron sulfate solution, which is sent to storage 60 from whence it may be recycled back to the waste water treatment process.

To prepare the floc, the aluminum and/or iron sulfate solution in vessel or tank 60 is continuously introduced (FIG. 1) via any one or more of lines or conduits 39, 40, 41, 42 into the main stream of water to be treated. Either before, during, or subsequent to the introduction of aluminum sulfate solution, the main water stream is alkalized by the addition of a concentrated aqueous calcium hydroxide solution. When the aluminum and/or iron sulfate and calcium hydroxide are combined a double displacement reaction occurs which forms calcium sulfate and aluminum and/or hydroxide, the latter in a form of a sticky floc that normally settles in the main water stream.

The foregoing process may be conducted continuously, semi-continuously (i.e., with certain steps conducted batchwise), or batchwise, depending upon the particular equipment available and on the size of the plant. Reagent make-up costs are minimal, and are represented almost entirely by calcium hydroxide and sulfur. Only a relatively minor amount of make up of aluminum and/or iron hydroxide or other suitable aluminum and iron containing materials are needed.

EMBODIMENT II

This embodiment, taken in conjunction with FIGS. 1 and 3, illustrates the system of the invention applied to the treatment of a municipal waste, and includes wet combustion or oxidation to recover the flocculating agent.

The wet or submerged combustion embodiment employs the waste disposal technique generally described in Zimmermann U.S. Patent 2,665,249 in which a liquid stream containing oxidizable waste is heated to a temperature of at least about 450° F. and up to the critical temperature of water and, at a sufficient pressure to maintain the water in the liquid phase, is contacted with compressed aid or other compressed gas containing molecular oxygen. As a result of this contact, the oxidizable wastes are converted to carbon monoxide, carbon dioxide, and other gaseous or solid products of combustion. The foregoing technique is particularly applicable to the system of the present invention in that it substantially reduces the need for large and expensive equipment such as thickener, furnaces, extraction vessels, and the like.

Referring to FIGURES 1 and 3 in conjunction with each other, the waste stream W from any one or more of conduits 14, 18, 26, and 30 are combined and sent to sulfur dioxide saturator 61. It will be noted that wet combustion may be used on waste streams 14, 18, which contain no recoverable flocculating agent, or, alternatively, these streams may be processed separately for recovery of the waste contents.

In any event, the streams W generally contain from about 4 to about 12% total solids (dry basis), of which about one quarter is the flocculating agent. In saturator 61, sufficient sulfur dioxide gas is added to lower the pH between 3 and 5, so as to convert the aluminum and/or hydroxide floc to an aluminum and/or iron sulfite complex, and, preferably, to maintain a slight excess of free sulfur dioxide.

From sulfur dioxide saturator 61, the sulfurized waste stream is conducted via conduit 62 to a high pressure pump and to a heater, not shown, and thence to the wet combustion reactor 64. In reactor 64, high pressure air is admitted via conduit 66 in an amount sufficient to oxidize carbonaceous wastes to carbon dioxide and carbon monoxide, and to convert sulfites to sulfates. Additionally, any other foreign metallic wastes, such as calcium compounds, are converted to the corresponding oxides, carbonates, or sulfates, many of which are insoluble in the mixture in wet combustion reactor 64.

From reactor 64, gaseous and liquid effluents are discharged. The gaseous effluent (not shown) is composed of nitrogen, carbon dioxide and carbon monoxide, water vapor, and lesser amounts of sulfur oxides, etc. The liquid effluent, discharged via conduit 67, is advantageously cooled (by indirect heat exchange against the incoming stream in conduit 62) and then sent to filter 68 for removal of insolubles such as unoxidized organic materials, calcium carbonate, sand, etc.

The filtrate from filter 68 is conducted via conduit 70 to storage facilities 71, and consists essentially of a dilute (about 3–7 weight percent) solution of aluminum and/or iron sulfate. This solution is suitable for recycle to the waste-containing water treatment process of FIG. 1 as stream F, where it is admixed with an alkali such as calcium hydroxide to form a floc.

Thus it is apparent that the wet combustion embodiment has the advantage of eliminating thickeners, furnaces, extraction vessels, and other equipment necessary in connection with dry combustion (FIG. 2) and, moreover, directly provides a stream that may be used as recycle to form the floc.

EMBODIMENT III

This embodiment, taken in conjunction with the waste water treatment process of FIG. 1 and the process of FIG. 4, illustrates the invention as applied to an untreated mixture of aluminum (or iron) hydroxide floc and waste. In this embodiment there need be no combustion whatever, and accordingly the concentrated wastes are recovered and are available for disposal as fertilizer or the like or burned without having any relation to the invention.

This embodiment is particularly pertinent to the recovery of flocculating agents, in this instance aluminum and/or iron, from the concentrate in water purification plants, where there is insufficient organic waste to warrant burning (much lower concentrations than cited in Embodiment II).

Referring to FIGS. 1 and 4, the waste stream W 26, 30, containing both aluminum and/or iron (ferrous or ferric) hydroxide floc and wastes, are conducted to a combined absorber-extractor 73, where sulfur dioxide gas or sulfurous acid solution is admitted in an amount sufficient to convert the aluminum or iron hydroxide into aluminum or iron sulfites. The influent stream to absorber 73 may contain as little as 2 or 3 weight percent total solids or as much as 12 or 15 percent, depending upon whether streams W are conducted directly to the absorber 73 or whether they are first concentrated, as by thickening, filtration, centrifugation, or the like. Indeed, concentration by filtering may provide a waste stream W of up to 50% total solids content, or even more, if efforts are made to obtain as dry a product as possible.

In absorber 73, the sulfur oxide gas (consisting essentially of sulfur dioxide, although the presence of up to about ten percent or so of sulfur trioxide is not disadvantageous) causes the aluminum or iron to form the soluble sulfite. Ordinarily the sulfur dioxide has little effect on organic wastes.

Absorber 73 may be provided with agitators to disperse the sulfur dioxide gas or sulfurous acid solution within the liquid stream W entering the absorber 73 so as to provide intimate contact between the aluminum or iron and the sulfur dioxide. Alternatively, the absorber 73 may be an elongated column into which the waste stream W is admitted near the top and withdrawn near the bottom, and the sulfur dioxide gas admitted near the bottom with excess being withdrawn at the top and absorbed to prevent air pollution. That is, this embodiment is applicable to a continuous as well as a batch-type of operation.

From the absorber 73, the effluent stream 75 is conducted to a filter 76 or other type of mechanical separator to separate the soluble aluminum and/or iron sulfite from insoluble wastes. Filter 76 may be a continuous (rotary) filter utilizing vacuum or a centrifuge, etc., to facilitate separation of solids from liquid, and may include one or more stages where in a waste wash is used to further assist in removing soluble aluminum and/or iron salts.

The discharge from filter 76 is composed of a concentrated waste stream 78, which is conducted to waste storage 79, and a liquid stream 80 conducted to storage 84. This liquid stream is a dilute solution of aluminum and/or iron sulfite complexes or salts, and may be recycled in its un-concentrated form to the system of FIG. 1 to serve as flocculating agent, F.

Wastes stored in storage facilities 79 contain only a trace of aluminum and/or iron compounds, and, since these wastes are essentially all organic, they may be utilized as natural fertilizer or burned in a furnace independent of the inventive process.

Iron may be substituted for aluminum and used with aluminum in embodiment III with equivalent results. In using iron, the additional advantage of obtaining an essentially iron-free effluent may be realized by contacting the effluent in conduits 18, 31, 34, 38 with additional oxygen-containing gas to oxidize any soluble ferrous compounds to the generally less soluble ferric compounds. The latter may be removed by trickle filter 29. Iron may be substituted to a limited extent for aluminum in illustrative Embodiments I and II.

Two inexpensive chemicals, namely, lime and sulfur, represent almost the entire chemical makeup in this invention. The relative minor makeup of the flocculating cations, namely, aluminum and iron, can be effected by adding sulfates and/or chlorides of these cations to the regenerated flocculating solutions, or by adding hydroxides of these cations to the floc-waste stream just prior to the sulfur oxide treatment. Metallic aluminum and/or iron and their oxides are not suitable for makeup chemicals in this process.

It is therefore apparent that the inventive process affords exceptional flexibility in operation and design, and permits the advantageous use of large quantities of flocculating agent which, in the absence of an effective recycle system, could not otherwise be employed. As a consequence, waste-containing water may be purified, disposed of, or reused.

I claim:

1. In a process for the treatment of waste-containing water for purification, disposal, or reuse, the improvement of:

(1) introducing into said water a soluble sulfur oxide salt of a member selected from the group consisting of aluminum and iron alkalized to form a hydroxide floc and thereby provide a mixture of the hydroxide floc of said member and wastes,
(2) contatcing the mixture of the hydroxide floc of said member and wastes with a reagent essentially consisting of sulfur dioxide to effect solution of the member as a soluble sulfur oxide salt,
(3) and cycling said dissolved sulfur oxide salt of said member to step (1).

2. In a process for the treatment of waste-containing water purification, disposal, or reuse, the improvement of:
(1) introducing into said water a soluble sulfur oxide salt of a member selected from the group consisting of aluminum and iron alkalized to form a hydroxide floc and thereby provide a mixture of the hydroxide floc of said member and wastes,
(2) contacting the mixture of the hydroxide floc of said member and wastes with a reagent essentially consisting of sulfur dioxide,
(3) burning the resultant mixture of hydroxide floc of said member, wastes, and sulfur dioxide under oxidizing combustion conditions to form an ash,
(4) extracting said ash with water to recover the sulfur oxide salt of said member,
(5) and cycling said dissolved sulfur oxide salt of said member to step (1).

3. In a process for the treatment of waste-containing water purification, disposal, or reuse, the improvement of:
(1) introducing into said water a soluble sulfur oxide salt of a member selected from the group consisting of aluminum and iron alkalized to form a hydroxide floc and thereby provide a mixture of the hydroxide floc of said member and wastes,
(2) contacting the mixture of the hydroxide floc of said member and wastes with a reagent essentially consisting of sulfur dioxide,
(3) subjecting the resultant mixture of hydroxide floc of said member, wastes, and sulfur dioxide to liquid phase combustion with an oxygen-containing gas,
(4) and cycling the resultant sulfur oxide salt of said member to step (1).

4. In a process for the treatment of waste-containing water for purification, disposal, or reuse, the improvement of:
(1) introducing into said water a soluble sulfur oxide salt of a member selected from the group consisting of aluminum and iron alkalized to form a hydroxide floc and thereby provide a mixture of the hydroxide floc of said member and wastes,
(2) contacting the mixture of hydroxide floc of said member and wastes with a reagent essentially consisting of sulfur dioxide to effect solution of the member as a soluble sulfur oxide salt,
(3) separating said solution of soluble sulfur oxide salt from said wastes,
(4) and cycling said dissolved sulfur oxide salt of said member to step (1).

References Cited

UNITED STATES PATENTS

| | | | |
|---|---|---|---|
| 653,741 | 7/1900 | Jewell | 210—47 |
| 3,171,804 | 3/1965 | Rice | 210—53 |
| 3,268,443 | 8/1966 | Cann | 210—47 |

MICHAEL E. ROGERS, *Primary Examiner.*